United States Patent
Lehr et al.

(10) Patent No.: US 8,843,720 B2
(45) Date of Patent: Sep. 23, 2014

(54) DYNAMIC VVDS EXPANSION

(75) Inventors: Douglas Lee Lehr, Austin, TX (US); Franklin Emmert McCune, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 13/171,378

(22) Filed: Jun. 28, 2011

(65) Prior Publication Data

US 2013/0007397 A1 Jan. 3, 2013

(51) Int. Cl.
*G06F 12/00* (2006.01)
*G06F 3/06* (2006.01)
*G06F 17/30* (2006.01)

(52) U.S. Cl.
CPC ........ *G06F 17/30312* (2013.01); *G06F 3/0605* (2013.01); *G06F 3/0632* (2013.01); *G06F 3/0607* (2013.01); *G06F 3/067* (2013.01); *G06F 3/0631* (2013.01); *G06F 3/0647* (2013.01)
USPC ............................ 711/165; 711/112; 711/114

(58) Field of Classification Search
CPC ..... G06F 12/02; G06F 3/0647; G06F 3/0646; G06F 3/067; G06F 3/0683; G06F 3/0689
See application file for complete search history.

(56) References Cited

U.S. PATENT DOCUMENTS

| 7,146,475 | B2 | 12/2006 | Perego |
| 7,707,186 | B2 | 4/2010 | LeCrone et al. |
| 8,161,262 | B2 * | 4/2012 | Yamamoto et al. ........... 711/171 |
| 2008/0155553 | A1 * | 6/2008 | Astigarraga et al. .......... 718/108 |
| 2010/0077169 | A1 | 3/2010 | Pace |

* cited by examiner

*Primary Examiner* — Reginald Bragdon
*Assistant Examiner* — Thanh D Vo
(74) *Attorney, Agent, or Firm* — Nelson and Nelson; Daniel P. Nelson; Alexis V. Nelson (57) ABSTRACT

A method for addressing an out-of-space condition for a Virtual Storage Access Method (VSAM) Volume Data Set (VVDS) includes detecting an out-of-space condition in a VVDS on a volume. The method creates, in response to the out-of-space condition, a new VVDS on the volume without adding a record to the old VVDS (e.g., by bypassing "catalog services"). The new VVDS is assigned a temporary name. The method then copies records from the old VVDS to the new VVDS. The method may then rename the old VVDS to a temporary name and rename the new VVDS to the original name of the old VVDS. The old VVDS may then be deleted. Alternatively, instead of renaming the old VVDS to a temporary name, the old VVDS may be deleted. The new VVDS may then be renamed to the original name of the old VVDS. A corresponding apparatus and computer program product are also described.

11 Claims, 7 Drawing Sheets

DYNAMIC VVDS EXPANSION

BACKGROUND

1. Field of the Invention

This invention relates to apparatus and methods for addressing out-of-space conditions in Virtual Storage Access Method (VSAM) volume data sets (VVDSs).

2. Background of the Invention

In the z/OS operating system, Virtual Storage Access Method (VSAM) volume data sets (VVDSs) are data sets that describe the characteristics of VSAM and Storage Management Subsystem (SMS) managed data sets residing on direct access storage device (DASD) volumes. These VVDSs typically reside on the same volumes where the VSAM and SMS-managed (non-VSAM) data sets reside. Every volume containing VSAM or SMS-managed data sets will typically contain a VVDS to describe the data sets that are stored thereon.

A VVDS typically contains three types of entries, or records: a VSAM volume control record (VVCR) that contains BCS back pointers and information to manage DASD space; a VSAM volume record (VVR) for each VSAM data set on the volume and containing information about the VSAM data set; and a non-VSAM volume record (NVR) for each non-VSAM data set on the volume and containing information about the non-VSAM data set.

VVDS access is required whenever VSAM data sets and SMS-managed data sets are processed (e.g., read from, written to, updated, etc.) on DASDs. This requires physical I/O to the volume(s) where the data sets reside, both to access the VVDS as well as the data sets described in the VVDS. Unfortunately, if a VVDS cannot be updated because the VVDS has run out of space (e.g., because it has reached its maximum size and cannot store any more entries), new data sets cannot be added to the volume. Existing data sets described in the VVDS and currently stored on the volume may also become inaccessible.

When an application is allocating or accessing a data set on a volume and the VVDS on the volume runs out of space, an error will occur and the application may receive an error message (e.g., an IDC3009I 50-30 error message in the z/OS operating environment). This error will cause an application outage since the application will be unable to access data on the volume. To resolve the error, a user is instructed to either (1) delete data sets from the volume (to free up space in the VVDS), or (2) create a new larger VVDS and recover all data sets to the volume from a backup. The first option may be infeasible since deleting data sets may be time-consuming and delete valuable data. The second option may be undesirable at least partly because of application downtime. The second option is also hindered by the fact that creating a new VVDS on the volume requires adding a record to the existing VVDS. Since the existing VVDS is full, such a record cannot be added.

In view of the foregoing, what are needed are apparatus and methods to more effectively address out-of-space conditions in VVDSs. Ideally, such apparatus and methods will avoid or minimize application outages.

SUMMARY

The invention has been developed in response to the present state of the art and, in particular, in response to the problems and needs in the art that have not yet been fully solved by currently available apparatus and methods. Accordingly, the invention has been developed to more effectively address out-of-space conditions in VSAM Volume Data Sets (VVDSs). The features and advantages of the invention will become more fully apparent from the following description and appended claims, or may be learned by practice of the invention as set forth hereinafter.

Consistent with the foregoing, a method for addressing an out-of-space condition for a VSAM Volume Data Set (VVDS) is disclosed herein. In certain embodiments, such a method includes detecting an out-of-space condition in a VVDS on a volume. The method creates, in response to the out-of-space condition, a new VVDS on the volume without adding a record to the old VVDS (e.g., by bypassing "catalog services"). The new VVDS is assigned a temporary name. The method then copies records from the old VVDS to the new VVDS. The method may then rename the old VVDS to a temporary name and rename the new VVDS to the original name of the old VVDS. The old VVDS may then be deleted. Alternatively, instead of renaming the old VVDS to a temporary name, the old VVDS may be deleted. The new VVDS may then be renamed to the original name of the old VVDS.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
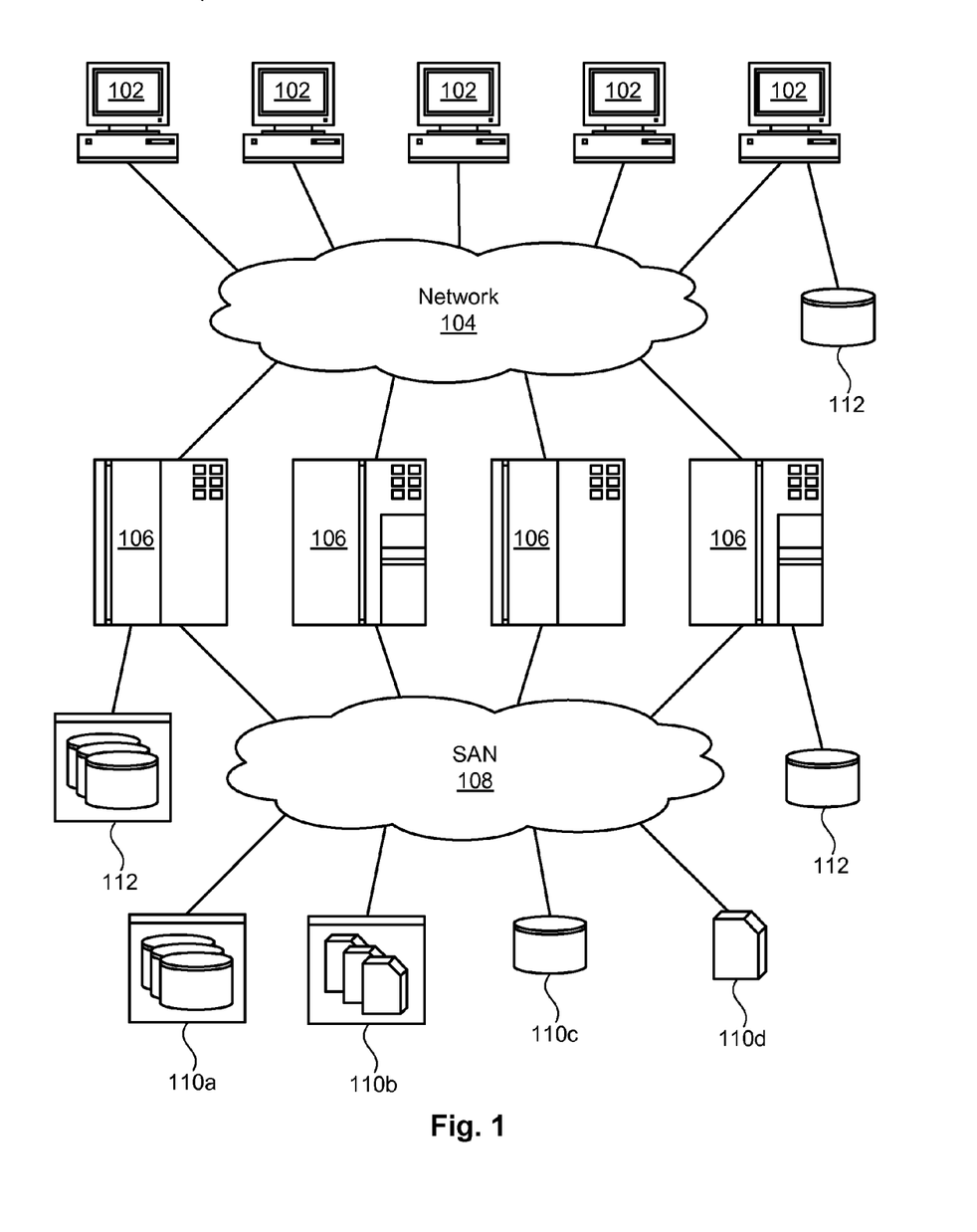
FIG. 1 is a high-level block diagram showing one example of an environment where an apparatus and method in accordance with the invention may be implemented.

Referring to FIG. 1, one example of a network architecture 100 is illustrated. The network architecture 100 is presented to show one example of an environment where an apparatus and method in accordance with the invention may be implemented. The network architecture 100 is presented only by way of example and not limitation. Indeed, the apparatus and methods disclosed herein may be applicable to a wide variety of network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking protocol such as Fibre Channel (FC).

Figure 2:
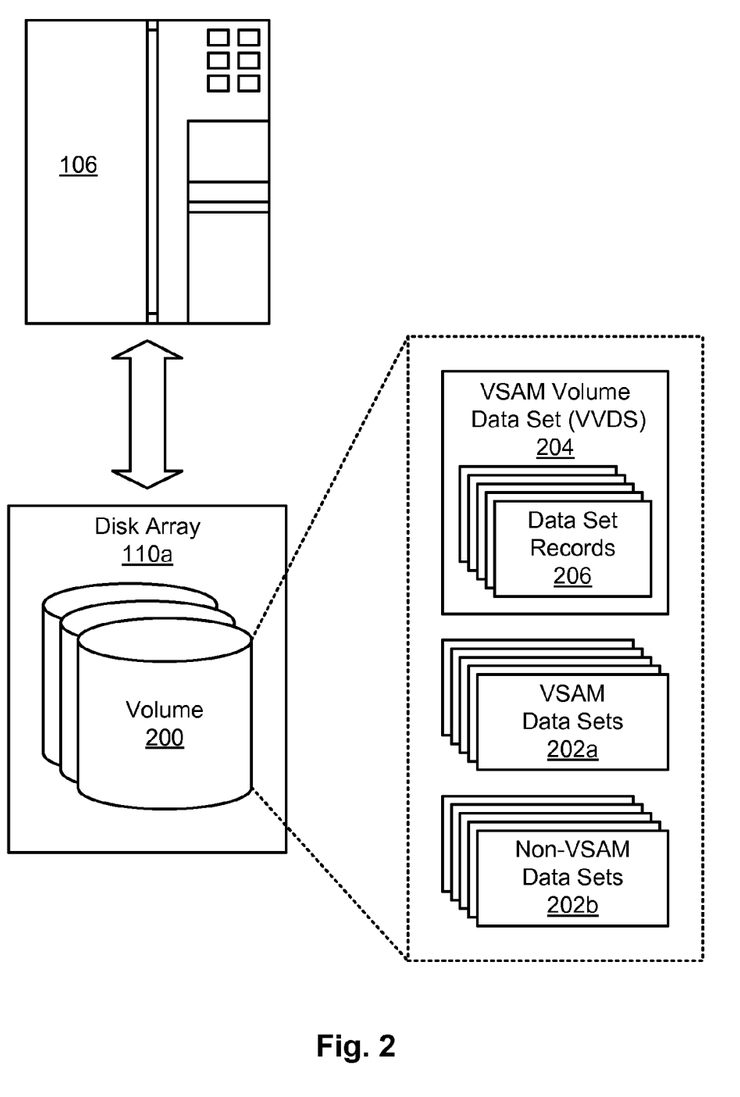
FIG. 2 is a high-level block diagram showing an example of a volume containing a VVDS and various data sets.

Referring to FIG. 2, in certain embodiments, a host device 106 may utilize the Virtual Storage Access Method (VSAM) to access data sets 202 residing on storage system volumes 200, such as disk volumes 200 or other direct access storage device (DASD) volumes 200. These data sets 202 may include both VSAM data sets 202a as well as non-VSAM (e.g., SMS-managed) data sets 202b. A VSAM volume data set (VVDS) 204 may be stored and maintained on a volume 200 to describe the data sets 202 residing on the volume 200. Each volume 200 containing VSAM and SMS-managed data sets 202 will typically contain a VVDS 204 to describe the data sets 202.

As previously described, a VVDS 204 may contain three types of records 206 describing the data sets 202: a VSAM volume control record 206 (VVCR) that contains BCS back pointers and information to manage DASD space; a VSAM volume record 206 (VVR) for each VSAM data set 202a on the volume 200 and containing information about the VSAM data set 202a; and a non-VSAM volume record 206 (NVR) for each non-VSAM data set 202b on the volume 200 and containing information about the non-VSAM data set 202b.

Access to the VVDS 204 is required whenever VSAM data sets 202a and SMS-managed data sets 202b are processed (e.g., read from, written to, updated, etc.) on a DASD volume 200. This requires physical I/O to the volume 200 where the data sets 202 reside, both to access and update the VVDS 204 as well as the data sets 202 described in the VVDS 204. Unfortunately, if a VVDS 204 cannot be updated because the VVDS 204 has run out of space (e.g., because it has reached its maximum size and cannot store any more records 206), data sets 202 cannot be added to the volume 200. Data sets 202 described in the VVDS 204 and currently stored on the volume 200 may also become inaccessible.

Figure 3:
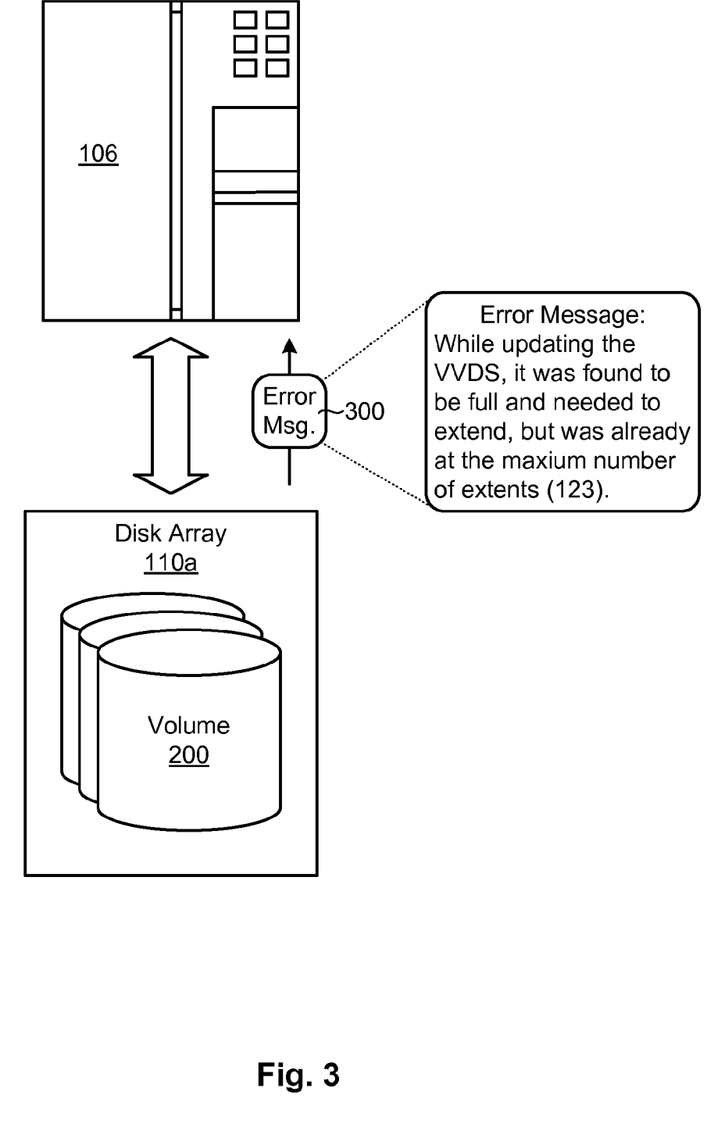
FIG. 3 is a high-level block diagram showing an example of an error message sent in response to an out-of-space condition in a VVDS.

Referring to FIG. 3, when an application residing on a host system 106 is allocating or accessing data on a volume 200 and the VVDS 204 on the volume 200 runs out of space, the allocation will fail and the application will receive an allocation error message 300. For example, in the z/OS operating environment, an IDC3009I 50-30 error message 300 may be returned to the application. The IDC3009I 50-30 error message, in particular, states the following: "While updating the VVDS, it was found to be full and needed to extend, but was already at the maximum number of extents." In the z/OS operating environment, a data set 202 on a single volume 200 is limited to 123 extents. Because a VVDS 204 is unique to a particular volume 200, it typically resides on a single volume 200, and thus is limited to 123 extents. If a VVDS 204 attempts to extend beyond this number of extents, an error message 300 such as that illustrated in FIG. 3 will be generated and returned to the application. Such allocation errors may occur with increased frequency as users move to larger volumes 200, such as Extended Addressable Volumes, if the size of the VVDSs 204 on such volumes 200 is not increased accordingly.

Because access to the VVDS 204 is required whenever VSAM data sets 202a or non-VSAM data sets 202b are allocated or accessed, the application may be unable to allocate or access data on the volume 200 if the VVDS 204 has run out of space. This will cause the application to experience an outage until the problems with the VVDS 204 are addressed. Thus, apparatus and methods are needed to address out-of-space conditions in VVDSs 204 that will avoid or minimize application outages.

Figure 4:
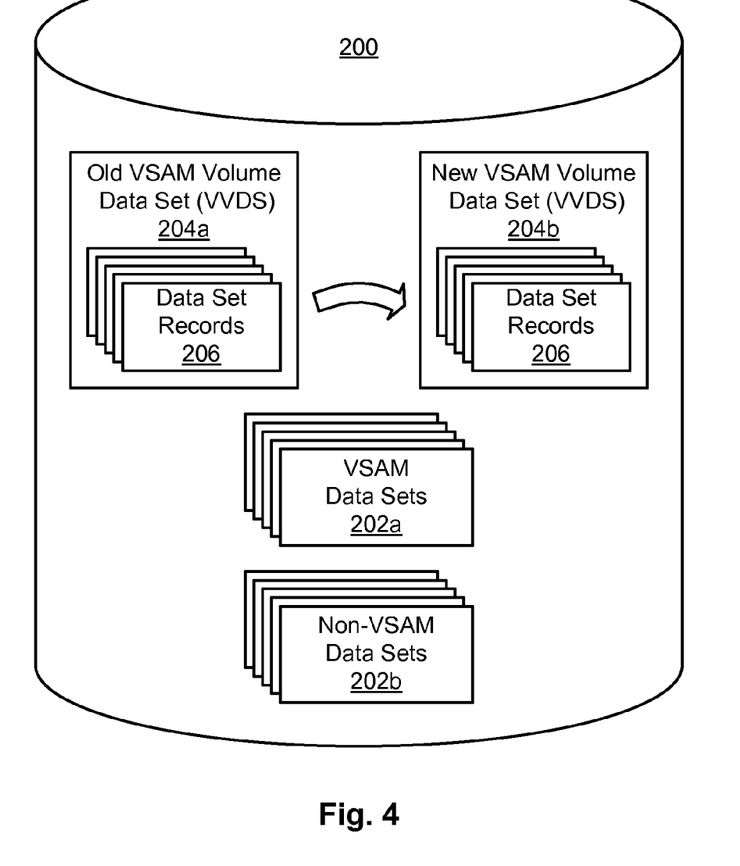
FIG. 4 is a high-level block diagram showing a technique for expanding a VVDS in response to an out-of-space condition.

Referring to FIG. 4, a high-level view of a technique for addressing an out-of-space condition in a VVDS 204 is illustrated. Such a technique involves initially monitoring for and detecting out-of-space conditions in a VVDS 204a. In response to detecting an out-of-space condition, a new larger VVDS 204b is created on the volume 200 without inserting a record for the new VVDS 204b into the old VVDS 204a. Ordinarily, this would not be possible since creating a new VVDS 204b would require adding a record 206 to the existing VVDS 204a (which is already full). However, the present technique may create the new VVDS 204b without calling "catalog services," thereby avoiding the addition of a record 206 to the old VVDS 204a.

In general, "catalog services" are access method components that handle the allocation of disk space, opening and closing of data sets, and protecting data from concurrent use in ways that might corrupt or damage the data. Invoking catalog services is generally necessary to allocate a new data set 202 on a volume 200. When a new data set 202 is allocated on a volume 200, catalog services will add a record 206 for the data set 202 to the VVDS 204 of the volume 200. The described technique bypasses catalog services when allocating a new VVDS 204b so that a record 206 is not added to the existing VVDS 204a.

Upon creating a new VVDS 204b, the new VVDS 204b may be assigned a temporary name. Data records 206 may then be copied from the old VVDS 204a to the new VVDS 204b, preferably using a fast replication technique such as IBM's FlashCopy, while continuing to bypass catalog services. Once the records 206 are logically copied from the old VVDS 204a to the new VVDS 204b, the old VVDS 204a may be renamed to a temporary name and the new VVDS 204b may be renamed to the original name of the old VVDS 204a. At this point, the new VVDS 204b may become the active VVDS 204 of the volume 200, while the old VVDS 204a becomes inactive. The old VVDS 204a may then be deleted from the volume 200.

Figure 5:
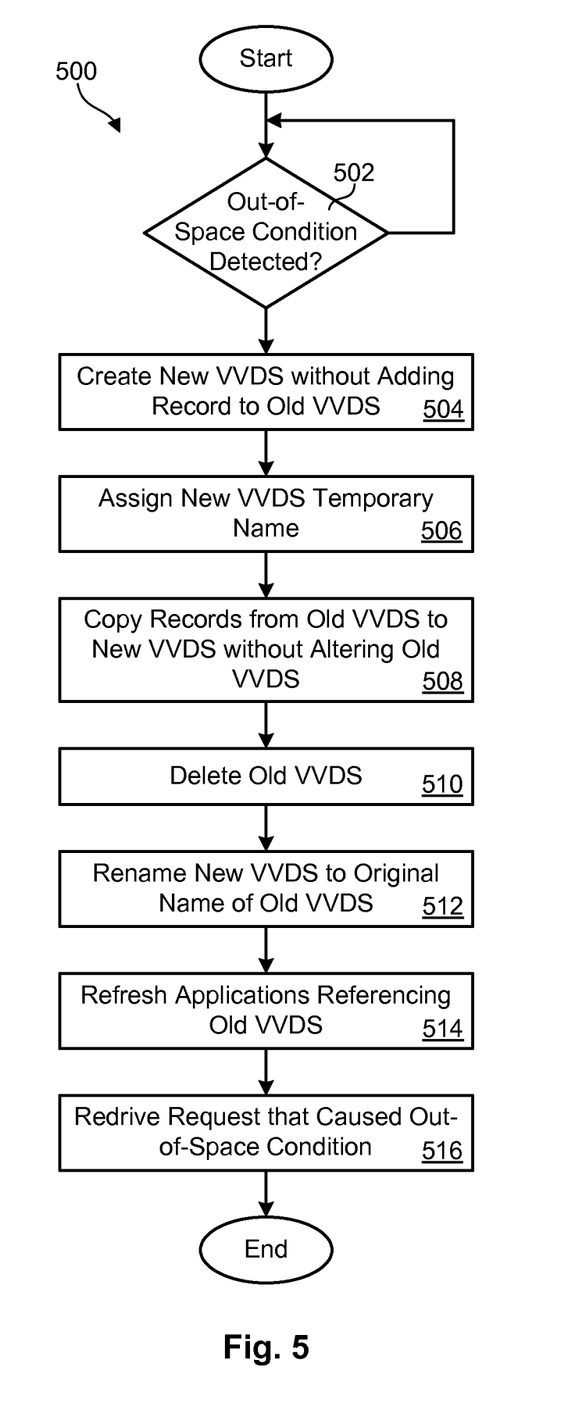
FIG. 5 is a flow chart showing one embodiment of a method for expanding a VVDS in response to an out-of-space condition.

Referring to FIG. 5, one embodiment of a method 500 for addressing an out-of-space condition in a VVDS 204 is illustrated. As shown, the method 500 initially determines 502 whether an out-of-space condition is detected in the VVDS 204. In general, this condition will be detected when a request to update the VVDS 204 fails due to lack of space. When updating the VVDS 204, a job will generally place an exclusive lock on the VVDS 204 to prevent interceding operations from occurring on the VVDS 204 while the job is executed. The remaining steps 504, 506, 508, 510, 512, 514, 516 may be performed while this exclusive lock is in place.

With the exclusive lock in place, the method 500 creates 504 a new VVDS 204b without adding a record 206 to the old VVDS 204a and assigns 506 the new VVDS 204b a temporary name. The method 500 then copies 508 records 206 from the old VVDS 204a to the new VVDS 204b without altering the old VVDS 204a. Once all records 206 are logically copied from the old VVDS 204a to the new VVDS 204b, the method 500 deletes 510 the old VVDS 204a. The method 500 then renames 512 the new VVDS 204b to the original name of the old VVDS 204a. The method 500 then refreshes 514 applications that were using the old VVDS 204a (e.g., using commands such as F CATALOG, VCLOSE(volser)) so that these applications now reference the new VVDS 204b. The method 500 may then redrive 516 the request that failed as a result of the out-of-space condition in the VVDS 204. Since the size of the VVDS 204 has increased, the job will complete without error. The job may then release the exclusive lock to allow other jobs to access and update the new VVDS 204b.

Figure 6:
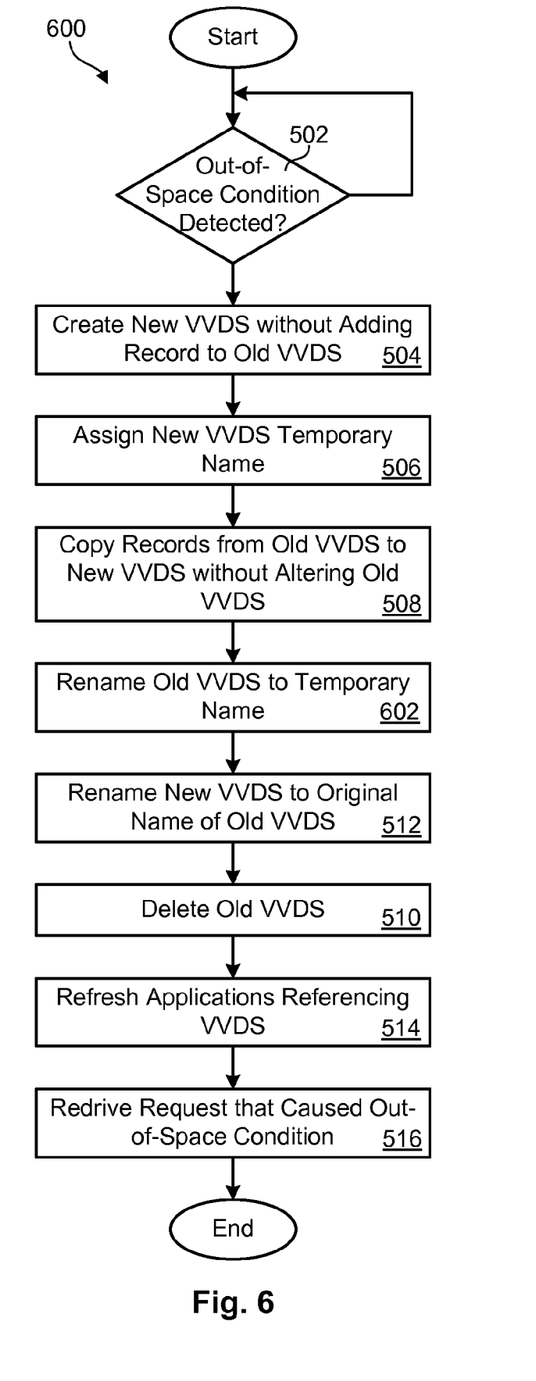
FIG. 6 is a flow chart showing another embodiment of a method for expanding a VVDS in response to an out-of-space condition.

Referring to FIG. 6, another embodiment of a method 600 for addressing an out-of-space condition in a VVDS 204 is illustrated. This method 600 is substantially identical to the method 500 illustrated in FIG. 5, except that once all records 206 are logically copied from the old VVDS 204a to the new VVDS 204b, the method 600 renames 602 the old VVDS 204a to a temporary name. The method 600 then renames 512 the new VVDS 204b to the original name of the old VVDS 204a. The method 600 then deletes 510 the old VVDS 204a. Alternatively, the method 600 may delete 510 the old VVDS 204a after the applications have been refreshed 514 or the request that caused the out-of-space condition has been redriven 516. This will ensure that if any problems arise with the new VVDS 204b, the old VVDS 204a can be recovered. Upon determining that no problems exist, the old VVDS 204a may be deleted 510.

Figure 7:
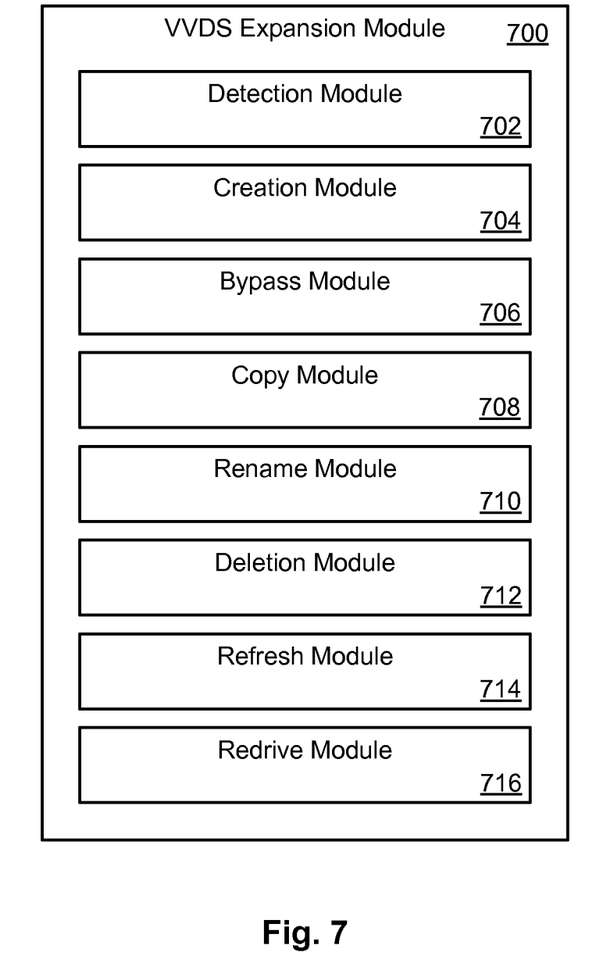
FIG. 7 is a high-level block diagram showing a VVDS expansion module for implementing the methods described in FIGS. 5 and 6.

Referring to FIG. 7, in certain embodiments, the methods 500, 600 described in FIGS. 5 and 6 may be implemented in the form of one or more modules. These modules may be collectively referred to as a VVDS expansion module 700. These modules may be implemented in hardware, software or firmware executable on hardware, or a combination thereof.

The modules may be implemented on a host system 106, storage system 110, or other suitable device. The modules are presented only by way of example and are not intended to be limiting. Indeed, alternative embodiments may include more or fewer modules than those illustrated. It should also be recognized that, in some embodiments, the functionality of some modules may be broken into multiple modules or, conversely, the functionality of several modules may be combined into a single module or fewer modules.

As shown, the VVDS expansion module 700 may include one or more of a detection module 702, a creation module 704, a bypass module 706, a copy module 708, a rename module 710, a deletion module 712, a refresh module 714, and a redrive module 716. As shown, a detection module 702 may be configured to monitor for and detect out-of-space conditions in VVDSs 204. Upon detecting such a condition, a creation module 704 may create a new larger VVDS 204b on the volume 200 with a temporary name. When creating the new VVDS 204b, a bypass module 706 may bypass catalog services or other functions, there allowing the new VVDS 204b to be created without adding a record 206 to the old VVDS 204a. A copy module 708 copies records 206 from the old VVDS 204a to the new VVDS 204b.

Once all records 206 are logically copied from the old VVDS 204a to the new VVDS 204b, a rename module 710 may rename the old VVDS 204a to a temporary name. The rename module 710 may also rename the new VVDS 204b to the original name of the old VVDS 204a. This will ensure that the old VVDS 204a and the new VVDS 204b do not have the same name at the same time. The deletion module 712 may then delete the old VVDS 204a. The refresh module 714 may then refresh applications that reference the old VVDS 204a to now reference the new VVDS 204b. The redrive module 716 may then redrive any request that failed as a result of the out-of-space condition in the VVDS 204. Once the job associated with the request completes, the exclusive lock on the VVDS 204 may be released to allow other jobs to complete.

Embodiments of the invention art desirable in that they enable a VVDS 204a to reallocate to a larger data set during the extend process. Instead of extending in the usual manner, the VVDS 204a is copied in the background to a new larger VVDS 204b. The job that triggered the out-of-space condition will actually succeed since the out-of-space condition on the VVDS 204 is remedied. This will allow the job to add to or modify the VVDS 204 without causing an outage. This, in turn, will avoid drastic recovery measures, such as recovering all data sets 202 on the volume 200 from a backup.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A computer program product for addressing an out-of-space condition for a Virtual Storage Access Method (VSAM) Volume Data Set (VVDS), the computer program product comprising a non-transitory computer-usable storage medium having computer-usable program code embodied therein, the computer-usable program code comprising:
   computer-usable program code to detect an out-of-space condition for an old VVDS on a volume, the old VVDS having an original name;
   computer-usable program code to create, in response to the out-of-space condition, a new VVDS on the volume without adding a record for the new VVDS to the old VVDS;
   computer-usable program code to assign the new VVDS a first temporary name;
   computer-usable program code to copy records from the old VVDS to the new VVDS;
   computer-usable program code to delete the old VVDS from the volume; and
   computer-usable program code to rename the new VVDS to the original name of the old VVDS.

2. The computer program product of claim 1, further comprising computer-usable program code to rename the old VVDS to a second temporary name prior to renaming the new VVDS to the original name of the old VVDS.

3. The computer program product of claim 1, further comprising computer-usable program code to bypass catalog services when creating the new VVDS on the volume.

4. The computer program product of claim 1, further comprising computer-usable program code to bypass catalog services when copying records from the old VVDS to the new VVDS.

5. The computer program product of claim 1, wherein renaming the new VVDS to the original name comprises renaming the new VVDS to the original name without invoking catalog services.

6. The computer program product of claim 1, further comprising computer-usable program code to refresh applications previously using the old VVDS to use the new VVDS.

7. The computer program product of claim 1, wherein the new VVDS is substantially larger than the old VVDS.

8. The computer program product of claim 1, wherein a request to update the VVDS initiated the out-of-space condition.

9. The computer program product of claim 8, further comprising computer-usable program code to redrive the request after the new VVDS is renamed to the original name of the old VVDS.

10. An apparatus to address an out-of-space condition for a Virtual Storage Access Method (VSAM) Volume Data Set (VVDS), the apparatus comprising:
   a storage system hosting a volume;
   a detection module to detect an out-of-space condition for an old VVDS on the volume, the old VVDS having an original name;
   a creation module to create, in response to the out-of-space condition, a new VVDS on the volume without invoking catalog services, the new VVDS having a first temporary name;
   a copy module to copy records from the old VVDS to the new VVDS without invoking catalog services;
   a deletion module to delete the old VVDS from the volume; and
   a rename module to rename the new VVDS to the original name of the old VVDS.

11. The apparatus of claim 10, wherein the rename module is further configured to rename the old VVDS to a second temporary name prior to renaming the new VVDS to the original name of the old VVDS.

* * * * *